United States Patent
Kyusojin

(10) Patent No.: US 7,120,158 B2
(45) Date of Patent: Oct. 10, 2006

(54) COMMUNICATION DEVICE AND METHOD FOR TRANSMITTING THROUGH THE USE OF ACCUMULATION OF CAPACITY TOKENS

(75) Inventor: Hiroshi Kyusojin, Kanagawa (JP)

(73) Assignee: Sony Corporation, Tokyo (JP)

( * ) Notice: Subject to any disclaimer, the term of this patent is extended or adjusted under 35 U.S.C. 154(b) by 992 days.

(21) Appl. No.: 10/020,668

(22) Filed: Dec. 12, 2001

(65) Prior Publication Data

US 2002/0114277 A1 Aug. 22, 2002

(30) Foreign Application Priority Data

Dec. 14, 2000 (JP) ............................ P2000-381113

(51) Int. Cl.
*H04L 12/56* (2006.01)
(52) U.S. Cl. ....................................... 370/412; 370/468
(58) Field of Classification Search ................ 370/412, 370/468, 428, 429, 230
See application file for complete search history.

(56) References Cited

U.S. PATENT DOCUMENTS

| | | | |
|---|---|---|---|
| 6,011,798 A * | 1/2000 | McAlpine .............. | 370/395.42 |
| 6,028,843 A * | 2/2000 | Delp et al. ................... | 370/235 |
| 6,047,000 A * | 4/2000 | Tsang et al. ................. | 370/412 |
| 6,657,987 B1 * | 12/2003 | Kumar et al. ............... | 370/346 |
| 6,882,623 B1 * | 4/2005 | Goren et al. ................ | 370/230 |
| 6,934,250 B1 * | 8/2005 | Kejriwal et al. ............ | 370/229 |

* cited by examiner

*Primary Examiner*—Derrick Ferris
(74) *Attorney, Agent, or Firm*—Sonnenschein Nath & Rosenthal LLP

(57) ABSTRACT

A transmission timing deciding unit decides the transmission timing for packet data based on time information from a time control unit and flow information from a flow information managing unit. At the decided timing, a packet transmitting unit transmits packet data at the head of the packet queue in the event that the accumulated capacity of a token exceeds zero, and further transmits best-effort flow packets in the event that predetermined conditions are satisfied. Thus, a communication apparatus and communication method can be provided wherein, in the event that a single network interface is shared by multiple flows, coexistence with best-effort flows can be realized while maintaining the reserved bandwidth for each flow so as to avoid collision of transmission requests from the flows.

11 Claims, 9 Drawing Sheets

| Version | HLength | Type Of Service | Total Length | |
|---|---|---|---|---|
| identification | | | flag | Fragment Offset |
| Time To Live | | Protocol | Header Checksum | |
| Source IP Address | | | | |
| Destination IP Address | | | | |
| Source Port Number | | | Destination Port Number | |

COMMUNICATION DEVICE AND METHOD FOR TRANSMITTING THROUGH THE USE OF ACCUMULATION OF CAPACITY TOKENS

RELATED APPLICATION DATA

The present application claims priority to Japanese Application(s) No(s). P2000-381113 filed Dec. 14, 2000, which application(s) is/are incorporated herein by reference to the extent permitted by law.

BACKGROUND OF THE INVENTION

1. Field of the Invention

The present invention relates to a communication device and communication method wherein, in the event that a single network interface is shared by multiple flows, transmission request from each of the flows are managed so as to avoid simultaneous transmission requests from two or more flows from occurring.

2. Description of the Related Art

In the event of guaranteeing bandwidth for multiple flows sharing a single network interface in a network communication system which transmits and receives packet data using a network such as the Internet as a communication network, methods have been proposed for appropriating packet queues to each flow, in order to avoid collision transmission requests from the flows. One example is Fair Queuing (Joins Nagle, On Packet Switched with Infinite Storage, IEEE Transaction on Communications Vol. 35 No. 4, pp. 435–438, April. 1987).

FIG. 9 is a conceptual diagram illustrating the processing of packet data according to this method. As shown in the diagram, which flow each transmission packet belongs to is determined based on some sort of identifier, and each transmission packet is placed in a dedicated queue provided in a rule correlated with that flow. For example, as shown in the figure, packet data having an identifier A1 is placed in a queue $Q_{a1}$, packet data having an identifier A2 is placed in a queue $Q_{a2}$, packet data having an identifier A3 is placed in a queue $Q_{a3}$, on through packet data having an identifier A10 being placed in a queue $Q_{a10}$.

As for the identifier for the packets, with a network wherein TCP/IP is used as a communication protocol for example, packet header information attached to each packet is used. FIG. 10 shows the configuration of a TCP/IP protocol packet header. As shown in the figure, combining part or all of the IP addresses and port Nos. of the transmitting side and receiving side of the packet data, protocol No., and other fields from this header allows a flow to which the packet belongs to be decided uniquely. Accordingly, the flow to which the packet belongs can be distinguished with such header information as a packet identifier, and the packet can be placed in a queue dedicated for the flow thereof.

Packets are dequeued from each queue at a timing set according to the bandwidth guaranteed for the flow thereof, and are transmitted to the network. The transmission intervals of the packets from each queue depend on the packet size and reservation bandwidth (reservation rate) of the flow, the packet sending timing of the application, and so forth, so there are cases wherein packet transmission requests occur simultaneously from multiple queues. In this case, a selection algorithm becomes necessary to decide which queue's packets to transmit first.

Now, with conventional network communication devices, there has been no effective method for managing packet transmission, so in the event that a network interface is shared by multiple flows, and particularly in the event that bandwidth-guaranteed flows and best-effort flows coexist, there has been no effective means for appropriately appropriating packet transmission to avoid collision transmission requests from the flows.

SUMMARY OF THE INVENTION

The present invention has been made in light of the above, and accordingly, it is an object thereof to provide a communication device and communication method wherein, in the event that a single network interface is shared by multiple flows, coexistence with best-effort flows can be realized while maintaining the reserved bandwidth for each flow so as to avoid collision of transmission requests from the flows.

To this end, the communication device according to the present invention is a communication device for transmitting multiple flows of packet data including bandwidth-guaranteed flow, comprising timing deciding means for determining transmission timing of packets of the bandwidth-guaranteed flow, and packet transmitting means for transmitting leading packet data in a packet queue according to accumulation capacity of tokens at a timing set by the timing deciding means.

Packet data at the head of the packet queue may be transmitted in the event that the accumulation capacity of the tokens exceeds zero. Also, the packet transmitting means may subtract the size of the transmitted packet from the accumulation capacity of the tokens following transmitting the packet data at the head of the packet queue.

The multiple flows of packet data may include best-effort flow along with bandwidth-guaranteed flow, and the packet transmitting means may transmit the best-effort flow packet data at a timing wherein the bandwidth-guaranteed flow packet data is not being transmitted.

The packet transmitting means may perform transmission of each packet data by time-division multiplex, transmission timing appropriated to each of the packet data may be real-time, time at which the packet data is actually transmittable may be managed as virtual time, and the best-effort flow packet data may be transmitted only in the event that the virtual time is ahead of the real-time.

The packet transmitting means may select the packet queue from a plurality of the bandwidth-guaranteed flow packet queues by procedures established beforehand, and transmit packet data at the head of the packet queue of the selected flow.

The timing deciding means may comprise a timer for generating timing for managing transmission time, and control means for determining the transmission timing for each flow, based on time information from the timer and information of each flow.

The present invention may further comprise packet enqueue means for enqueuing input packets to packet queues provided to flows to which the packets belong, according to identifiers of each of the packets.

The data length of the packet data may be fixed or variable.

Also, the communication method according to the present invention is a communication method for transmitting multiple flows of packet data including bandwidth-guaranteed flow, comprising a timing deciding step for determining transmission timing of packets of the bandwidth-guaranteed flow by time-division multiplexing, and a packet transmitting step for transmitting leading packet data in a packet queue according to accumulation capacity of tokens at the timing decided upon.

Packet data at the head of the packet queue may be transmitted in the event that the accumulation capacity of the tokens exceeds zero, and the size of the transmitted packet may be subtracted from the accumulation capacity of the tokens following transmitting the packet data at the head of the packet queue.

The multiple flows of packet data include best-effort flow along with bandwidth-guaranteed flow, and wherein the best-effort flow packet data is transmitted at a timing wherein the bandwidth-guaranteed flow packet data is not being transmitted.

Further, transmission timing appropriated to each of the packet data may be real-time, time at which the packet data is actually transmittable may be managed as virtual time, and the best-effort flow packet data may be transmitted only in the event that the virtual time is ahead of the real-time.

DESCRIPTION OF THE PREFERRED EMBODIMENTS

Figure 1:
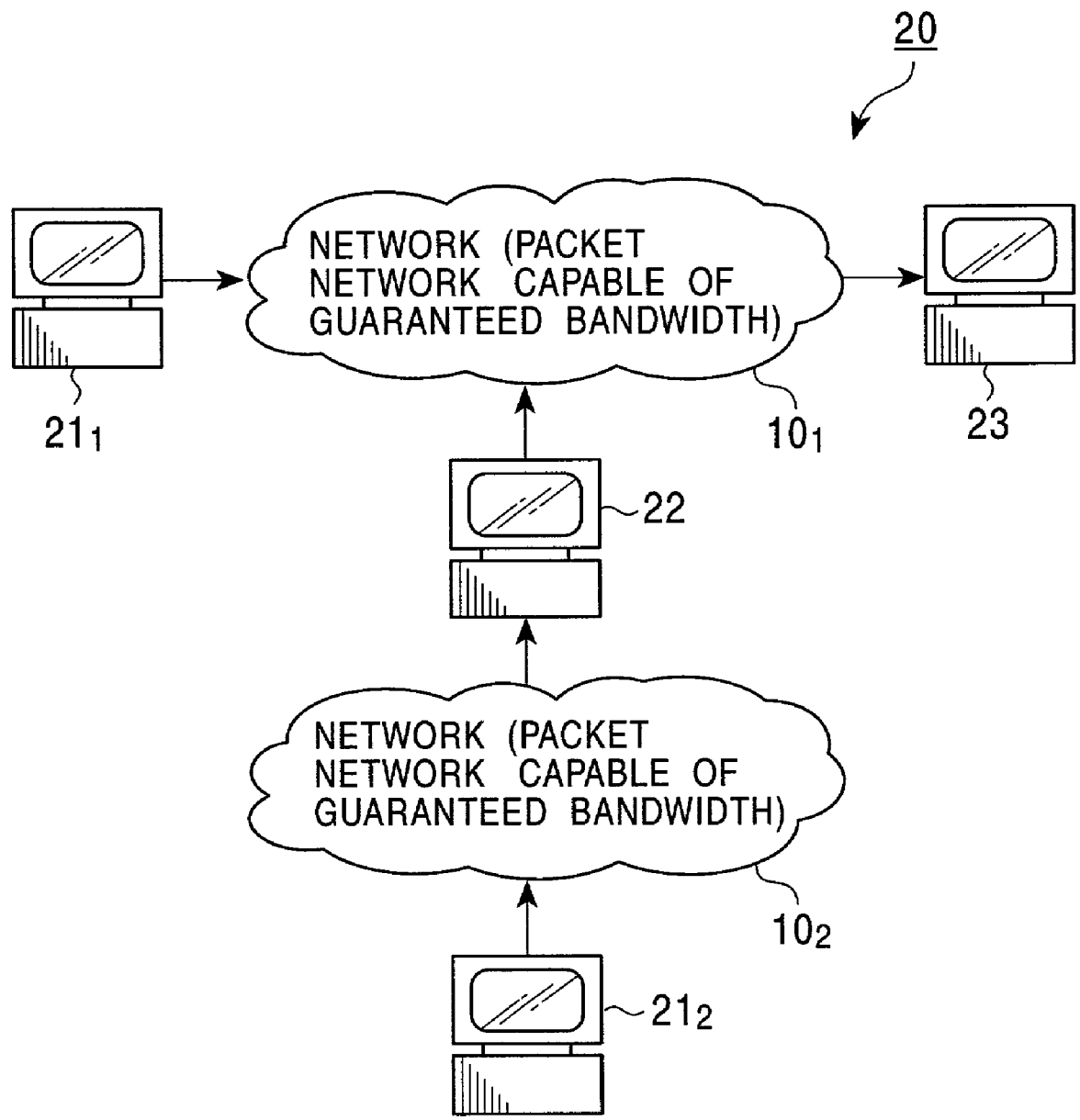
FIG. 1 is a configuration diagram illustrating an embodiment of a communication system containing a communication device according to the present invention.

FIG. 1 is a configuration diagram illustrating an embodiment of a communication system comprising a communication device according to the present invention.

As shown in FIG. 1, a communication system 20 has connected thereto networks $10_1$ and $10_2$ through an intermediate node 22, with a transmission terminal $21_1$ and reception terminal 23 connected to the network $10_1$, and transmission terminal $21_2$ connected to the network $10_2$.

Note that the configuration of the communication system 20 shown in FIG. 1 is only one example, and that the number and configuration of networks, and the number of transmission terminals and reception terminals to be connected to the network, may be arbitrarily decided. Also, network equipment such as a server, for example, may be used instead of transmission terminals and reception terminals.

Now, the network interface part used with the transmission terminals $21_1$ and $21_2$ and the intermediate node 22 corresponds to the communication device according to the present invention.

The following is a description of the components of the communication system 20.

<Networks $10_1$ and $10_2$>

The networks $10_1$ and $10_2$ are communication networks such as LANs (Local Area Networks) or the Internet, capable of transmission using fixed-length or variable-length packet data, and capable of bandwidth-guarantee for the communication.

<Transmission terminals $21_1$ and $21_2$>

The transmission terminals $21_1$ and $21_2$ are network equipment for transmitting data as packet data through networks, and can be configured of personal computers or server machines.

<Intermediate node 22>

In the example shown in FIG. 1, the intermediate node 22 relays packets received from the transmission terminal $21_2$ through the network $10_2$ and transmits the packets to the reception terminal 23 through the network $10_1$. The intermediate node 22 may be a router or the like.

<Reception terminal 23>

The reception terminal 23 is a terminal device such as a personal computer or the like for example, which un-packets packet data received through the network $10_1$ to generate contents data, and performs processing using the contents data.

With the communication system shown in FIG. 1, the transmission network interface used with the intermediate node 22 is approximately the same as the transmission network interface used with the transmission terminals $21_1$ and $21_2$. Though enqueue differs between the intermediate node 22 and the transmission terminals $21_1$ and $21_2$ in that, with the intermediate node 22, the packet input units enqueue packet data from the network $10_2$, and with the transmission terminals $21_1$ and $21_2$, packet data is enqueued from the application storing unit, the transmission processing of enqueued packet data is the same for all. Accordingly, in the following description, the description regarding the network interface can be applied to any of the transmission terminals $21_1$ and $21_2$ and the intermediate node 22.

Figure 2:
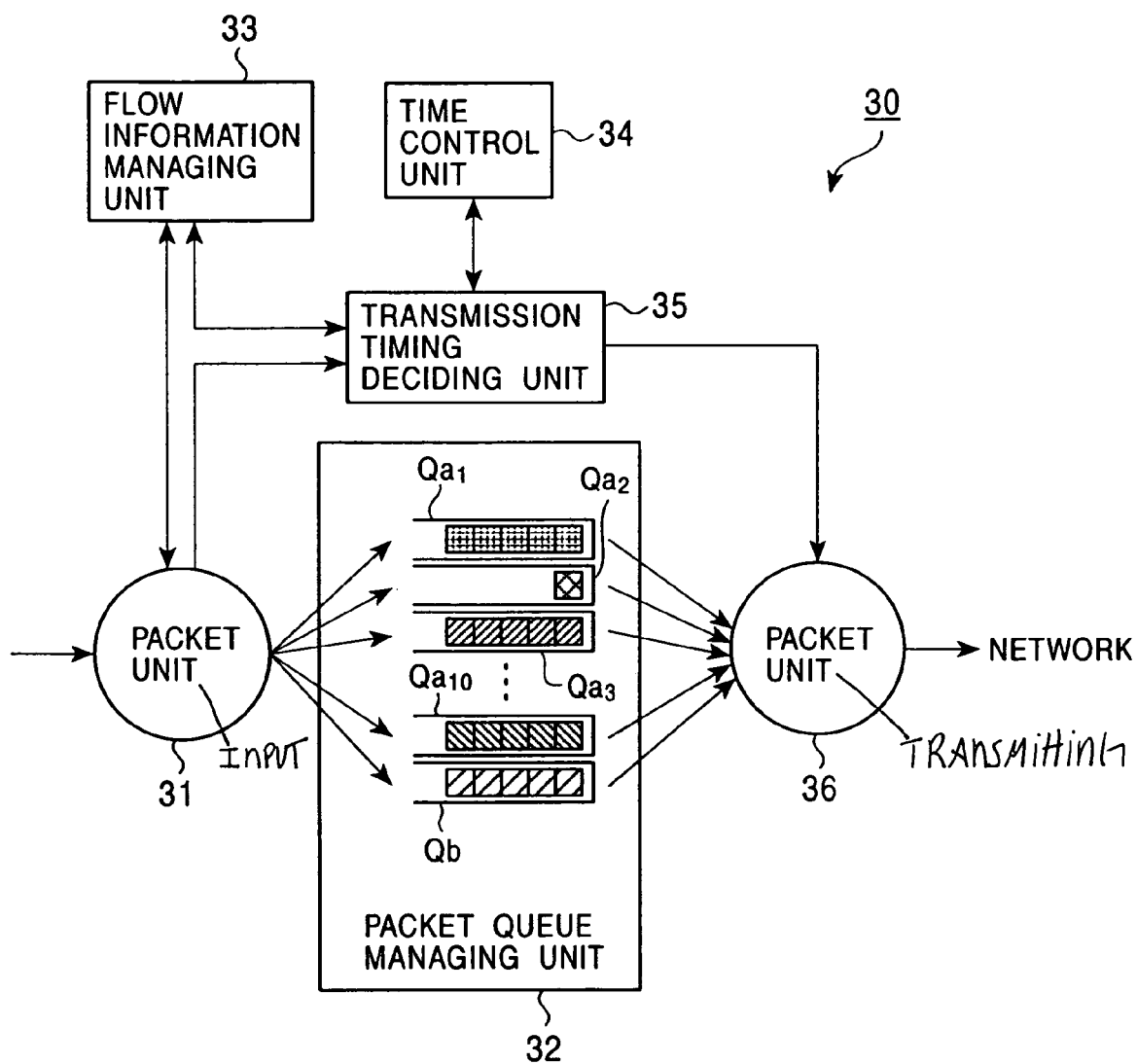
FIG. 2 is a block diagram illustrating a configuration example of the communication device according to the present invention.

FIG. 2 is a function block diagram illustrating a configuration example of a network interface used with the transmission terminals $21_1$ and $21_2$ and the intermediate node 22 making up the communication system shown in FIG. 1.

As shown in FIG. 2, a network interface 30 has a packet input unit 31, a packet queue managing unit 32, a flow information managing unit 33, a time control unit 34, a transmission timing deciding unit 35, and a packet transmitting unit 36.

The following is a description regarding the components of the network interface 30.

The packet input unit 31 classifies the packet data externally enqueued using identifiers within packet headers for each flow, based on the flow information managed by the later-described flow information managing unit 33, and enqueues packet data belonging to the same flow in the same packet queue into the packet queue managing unit 32.

The packet data is enqueued from an application storing unit or from a network. For example, in the communication system shown in FIG. 1, with the transmission terminals $21_1$ and $21_2$, packet data with headers attached thereto is enqueued from respective application storing units, and with the intermediate node 22, packet data is enqueued from the network 10$_2$.

The packet queue managing unit 32 has multiple packet queues, with packet data enqueued from the packet input unit 31 having the flows to which they belong being classified by the identifiers thereof, and enqueued and stored in packet queues dedicated to each flow.

Also, the scheduling algorithm of the packet queues of the packet queue managing unit 32 is FIFO (first in first out).

As shown in FIG. 2, with the present embodiment, the packet queue managing unit 32 has, for example, packet queues $Q_{a1}$ through $Q_{a10}$ for storing bandwidth-guaranteed flow packet data, and a packet queue $Q_b$ for storing best-effort flow packet data.

The flow information managing unit 33 manages conditions for bandwidth guaranteeing required of each flow to which the packet data belongs, and so forth.

The time control unit 34 sets time to serve as a reference for stipulating the packet data transmission timing.

As described later, the time control unit 34 is used for controlling the time $C_n$ until a time wherein there is the need to transmit packet data enqueued at the head of the packet queue $Q_{an}$ of the packet queue managing unit 32 for performing bandwidth guaranteeing of the bandwidth-guaranteed flow $F_n$ with the time $t_c$ as a reference for the transmission timing deciding unit 35 to perform scheduling, wherein n is an integer that satisfies $1 \leq n \leq 10$.

The time control unit 34 can be configured of a timer, for example. With the present embodiment, the time control unit 34 is only used for scheduling with the transmission timing deciding unit 35 for time $C_n$ following transmission of packet data, and the transmission intervals of the packet data of the flows $F_n$ are known beforehand from the guaranteed bandwidth of the flows, so time is count with one timer, and the transmission time of the packet data and the transmission intervals of the flow are used to obtaining the time $C_n$.

The time control unit 34 may comprise timers of a number equivalent to the number of bandwidth-guaranteed flows $F_n$ regarding which the times $C_n$ are respectively counted.

The transmission timing deciding unit 35 decides upon a schedule for transmission timing of packets stored in the multiple packet queues of the packet queue managing unit 32 based on the control from the flow information managing unit 33, and instructs the packet transmitting unit 36 of the packet data transmission timing, based on the decided schedule.

At this time, transmission timing control is performed while making reference to reserved bandwidth and like information for flows with bandwidth reservation for the flow information managing unit 33. The transmission timing deciding unit 35 controls the timing for dequeuing the packet data from the respective queues, while referring to the bandwidths appropriated to each queue, the size of the packets actually in the queues, and the amount of time elapsed from packet enqueued.

The packet transmitting unit 36 extracts packet data from the decided packet queues and transmits the packet data to the network, following the schedule decided upon by the transmission timing deciding unit 35 regarding from which queues to dequeue packets at what timing.

Figure 3:
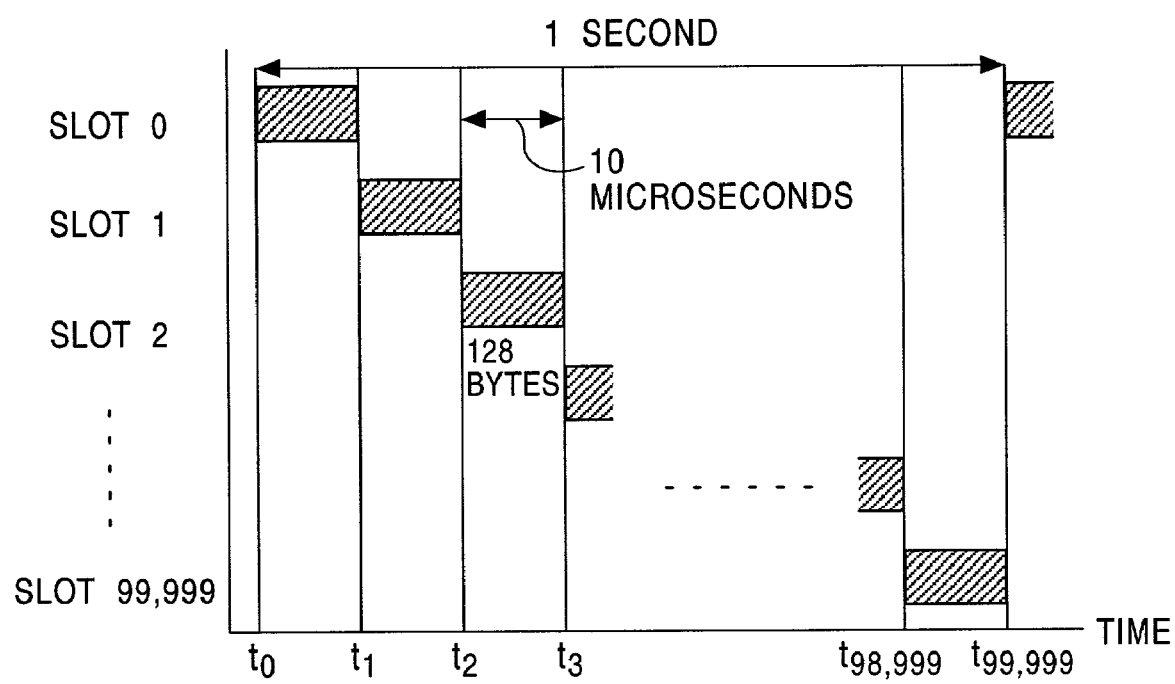
FIG. 3 is a timing chart illustrating transmission timing of fixed-length packets by time-division multiplexing wherein transmission time is divided into slots.

With the present embodiment, the transmission timing of the packet queues is controlled using time-division multiplexing, so that packet transmission request does not simultaneously occur from multiple packet queues. FIG. 3 is a timing chart in the case of dividing a certain transmission time into multiple slits and transmitting fixed-length data packets in each of the slots.

Here, in the event of performing scheduling for a data link with a bandwidth of 100 Mbps for example, with the granularity of the reserved flow at 1 Kbps and the time increment at one second, one second is divided into 100,000 slots, starting from Slot 0, Slot 1, Slot 2, and on through Slot 99,999, as shown in FIG. 3, so that each slot can occupy a 10 μs (microsecond) link. Opportunities for transmission are sequentially appropriated to the slots, and at the point that the last slot is reached, the process cycles to the first slot again. The number of slots appropriated to a flow determines the data transfer rate, i.e., the bandwidth, of that flow. Accordingly, in the event of a flow reserving a band, a predetermined number of slots according to the reserved bandwidth are appropriated to the flow.

However, with this method, a packet transmission permission for 128 bytes (1 Kbit) is provided with this example for each slot which is a scheduling unit for one time, i.e., 10 μs, by control of the flow granularity and time increment. This poses no problem for fixed-length packets, particularly for packets with packets sizes that are divisors of 128 bytes, but this cannot handle variable-length packets. Also, this cannot handle cases wherein flow burst transfer occurs at a range greater than the size of the time slots.

With the present embodiment, the above problem is solved using a token bucket algorithm. Here, tokens are generated each time a slot is scheduled, packets are extracted from the packet queue and transmitted only in the event that the amount of accumulated tokens exceed zero, and the size of the transmitted packet is subtracted from the accumulated amount of tokens following transmission. Thus avoids disparity dependent on packet size, and enables variable-length packets and burst transfer to be handled.

Figure 4:
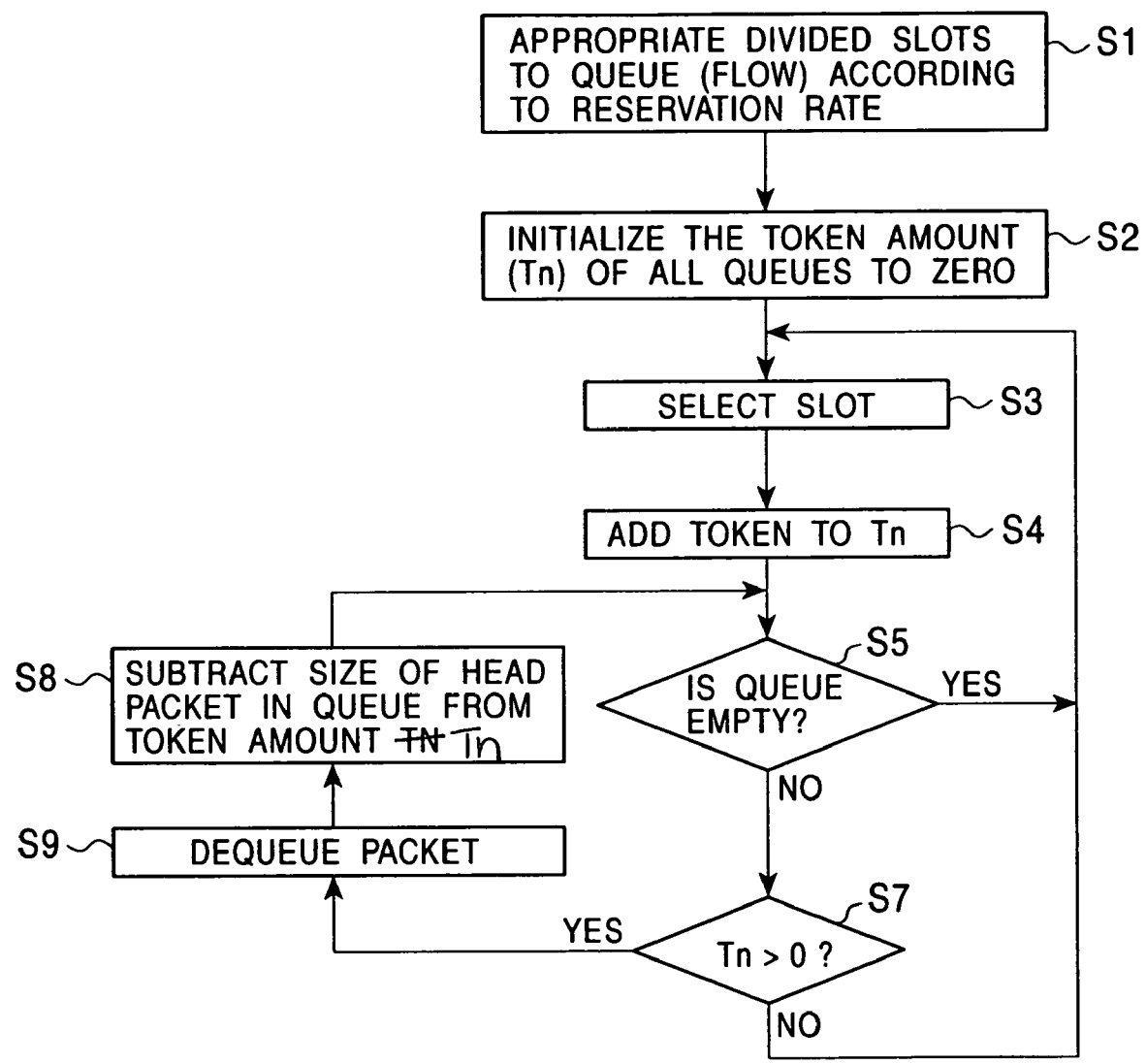
FIG. 4 is a flowchart of packet transmission processing using tokens.

FIG. 4 is a flowchart of packet transmission processing using tokens. This method will now be described in detail with reference to FIG. 4.

First, the divided slots are appropriated to the packet queues according to the reserved rate of the flows (step S1).

Then, token initialization is performed for each of the queues (step S2). At this time, the token amount ($T_n$) is initialized to zero for all queues.

Next, slot selection is performed (step S3), and tokens are added to the token amount $T_n$. Then, the bucket size is the maximum value of the token amount $T_n$ (step S4).

Next, decision is made regarding whether a queue to be processed is empty or not (step S5). In the event that the queue is empty, the flow returns to the processing in step S43 wherein the next slot is selected.

On the other hand, in the event that the queue is not empty, whether or not the accumulated token amount $T_n$ is greater than zero is checked (step S7). In the event that the token amount $T_n$ is greater than zero, the packets are dequeued from the queue and transmitted to the network (step S9). Also, the size of the packet transmitted is subtracted from the token amount $T_n$ (step S8), and the flow returns to the processing in step S5.

In the event that the comparison in step S7 shows that the token amount $T_n$ is zero or smaller, the flow returns to the processing in step S3 for selecting the next slot.

The above-described processing allows packets of 128 bytes or more to be transmitted with one slot. That is to say, the transmittable packet size is not restricted by the slot, and is dependently only on the token bucket size, for example. Accordingly, restrictions on the size of packets which can be transmitted at one slot are markedly slackened.

However, with such packet transmission processing, in the event that the packet length is not constant, there is no guarantee that one packet transmission will fit in one slot.

Figure 5:
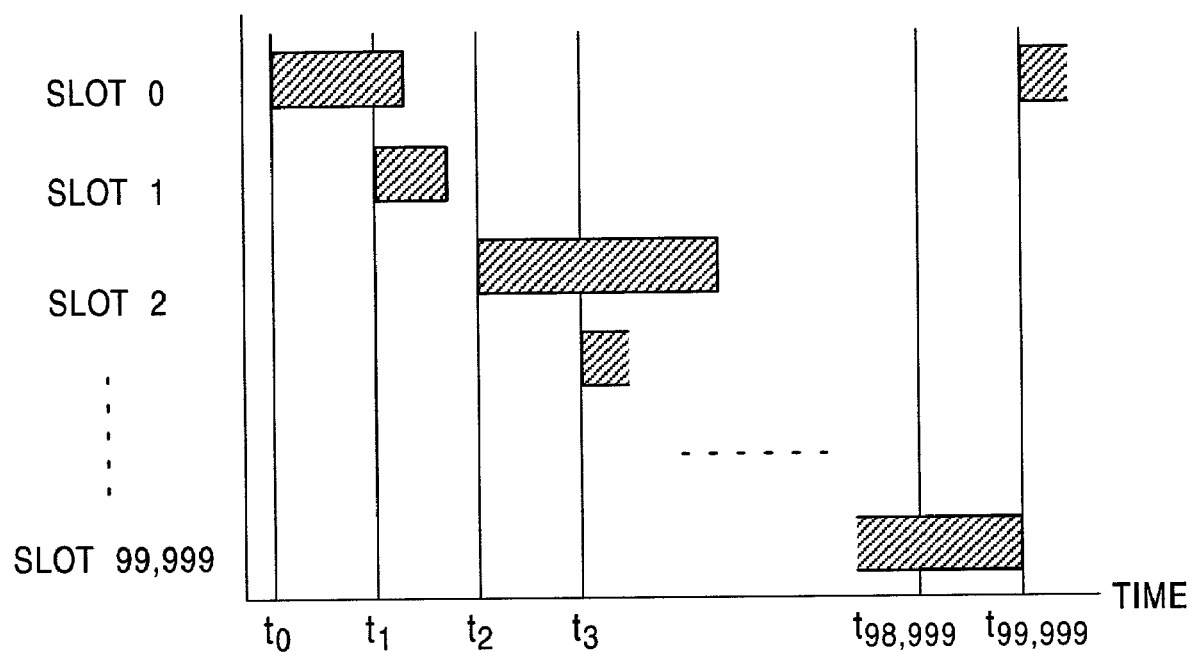
FIG. 5 is a timing chart illustrating transmission timing processing of variable-length packets.

FIG. 5 illustrates the transmission timing for packet data at each slot in the event that the packet length is variable. As shown in the figure, in the event that the time $t_n$ for scheduling that has been decided by the transmission timing deciding unit 35 is at constant intervals but the packet length is not constant, there may be cases wherein packet transmission cannot be completed with that schedule.

Here, the time $t_n$ for scheduling is set at different intervals from the actual time $r_n$ to be appropriated to the slots. That is to say, a virtual time $t_n$ is set for scheduling independent from the real time $r_n$. Then, all that is necessary is to control scheduling so that the difference between the real time $r_n$ and the virtual time $t_n$ is done away with in one slot division cycle unit, e.g., one second in the above example, on the average.

Also, in cases wherein burst transfer is permitted by the token bucket, in the event that burst transfer consecutively occurs in multiple flows, the difference between the real time and virtual time is not necessarily done away within one cycle, and in the event that the sum of reserved bands is guaranteed to be suppressed to the bandwidth of the links or below, the sum of burst capacities for the flows is the maximum value of time difference here.

Figure 6:
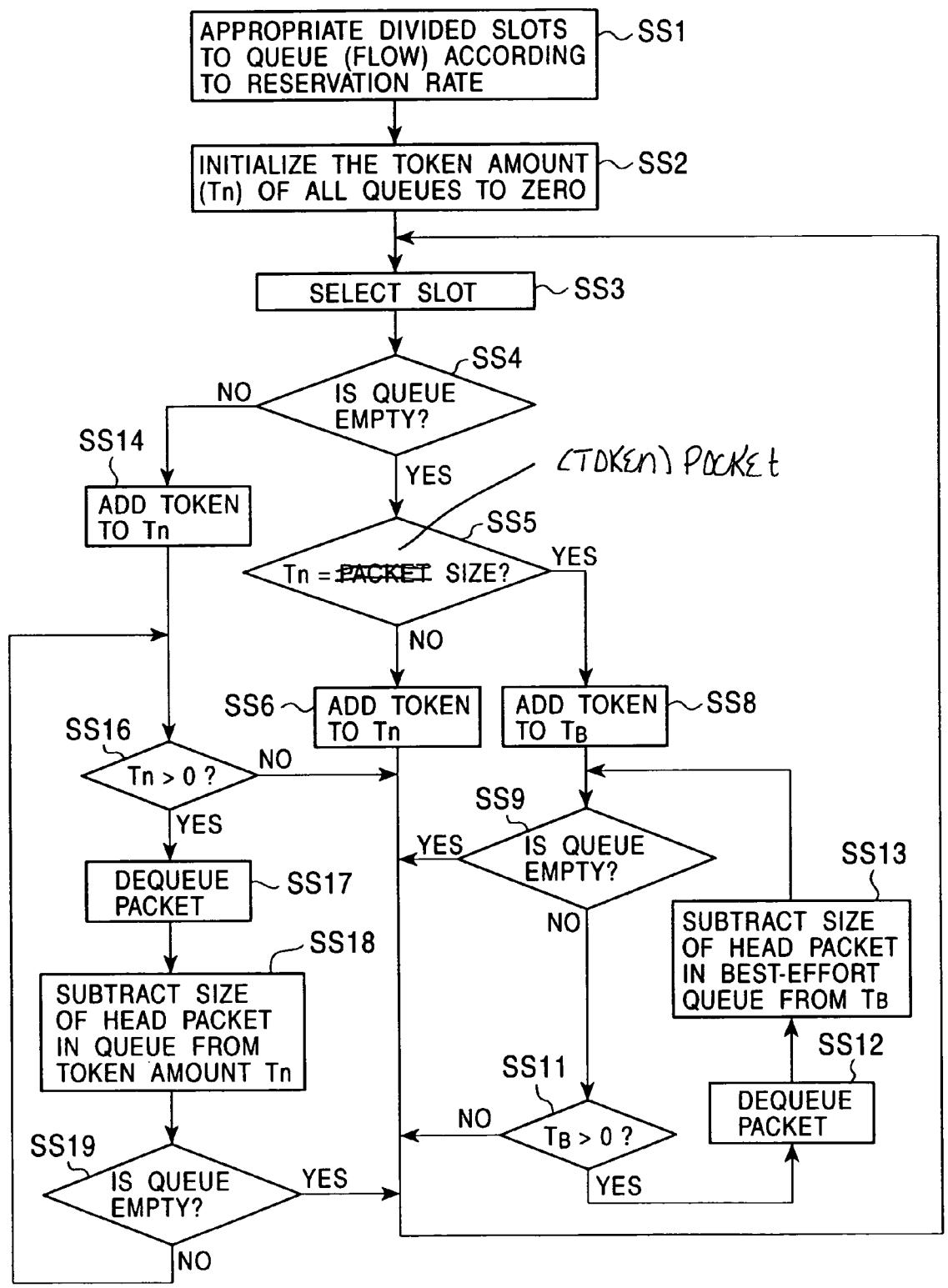
FIG. 6 is a flowchart illustrating an example of packet transmission scheduling processing in a case wherein band reservation flows and best effort flows coexist.

FIG. 6 is a flowchart illustrating such scheduling processing. The following is a description of the scheduling processing operation at a network interface according to the present embodiment, with reference to FIG. 6.

First, the divided slots are appropriated to the queues (flows) according to the reserved rate (reserved bandwidth) of the flows (step SS1).

Then, the token amount ($T_n$) is initialized to zero for all queues (step SS2).

Next, slot selection is performed (step SS3) Then, a queue to be transmitted is selected, and decision is made regarding whether the queue is empty or not (step SS4).

In the event that the decision in step SS4 shows that the queue is not empty, the processing in step SS14 is carried out. The processing from SS14 on will be described in detail later.

In the event that the decision in step SS4 shows that the queue is empty, decision is made regarding whether or not the token amount $T_n$ has reached the bucket size or not (Step SS5). In the event that this decision shows that the token amount $T_n$ has not reached the bucket size, a token is added to the token amount $T_n$ (step SS6). Then, the flow returns to the processing in step SS3 wherein the next slot is selected.

In the event that the decision in step SS5 shows that the token amount $T_n$ has reached the bucket size, the token is added to the token amount $T_B$ of the best-effort flow (step SS8). Then, decision is made regarding whether the queue provided for the best-effort flow is empty or not (step SS9).

In the event that the decision shows that the queue is empty, the flow returns to the processing in step SS3. On the other hand, in the event that the decision shows that the queue is not empty, whether or not the token amount $T_B$ is greater than zero is checked (step SS11). In the event that the comparison shows that the token amount $T_B$ is greater than zero, the packet data is dequeued from the head of the best-effort queue and transmitted to the network (step SS12). The size of the packet transmitted is subtracted from the token amount $T_B$ (step SS13), the processing in step SS9 is performed, and transmission processing for the next packet is performed.

In the event that the comparison in step SS11 shows that the token amount $T_B$ has not yet reached zero, the flow returns to the processing in step SS43 wherein the next slot is selected.

In the event that the decision in the processing in step SS4 shows that the queue is not empty, first, a token is added to the token amount $T_n$ (step SS14).

Then, whether or not the token amount $T_n$ is greater than zero is checked (step SS16).

In the event that the comparison shows that the token amount $T_n$ is zero or smaller, the flow returns to the processing in step SS3.

On the other hand, in the event that the token amount $T_n$ is greater than zero, packets are extracted from the head of the queue and transmitted (step SS17).

Then, the size of the packet transmitted is subtracted from the token amount $T_n$ (step SS18).

Next, decision is made regarding whether the queue is empty or not (step SS19). In the event that the decision shows that the queue is empty, the flow returns to the processing in step SS3.

Conversely, in the event that the queue is not empty, the processing in step SS16 is carried out. That is to say, whether or not to transmit the leading packet of the queue is decided.

The above-described scheduling processing is sequentially performed for all queues appropriated to bandwidth-guaranteed flows and best-effort flows. Consequently, best-effort flow packet data transfer can be realized while guaranteeing the transfer rate of bandwidth-guaranteed flow packet data. Bandwidth-guaranteed flow packet data transfer is performed with priority, and only in the event that a bandwidth-guaranteed flow queue is empty, i.e., only in the event that there are no packets in that queue, are tokens appropriated to best-effort flows, so best-effort flow packet data transfers can be prevented from affecting bandwidth-guaranteed flow packet data transfers.

Figure 7:
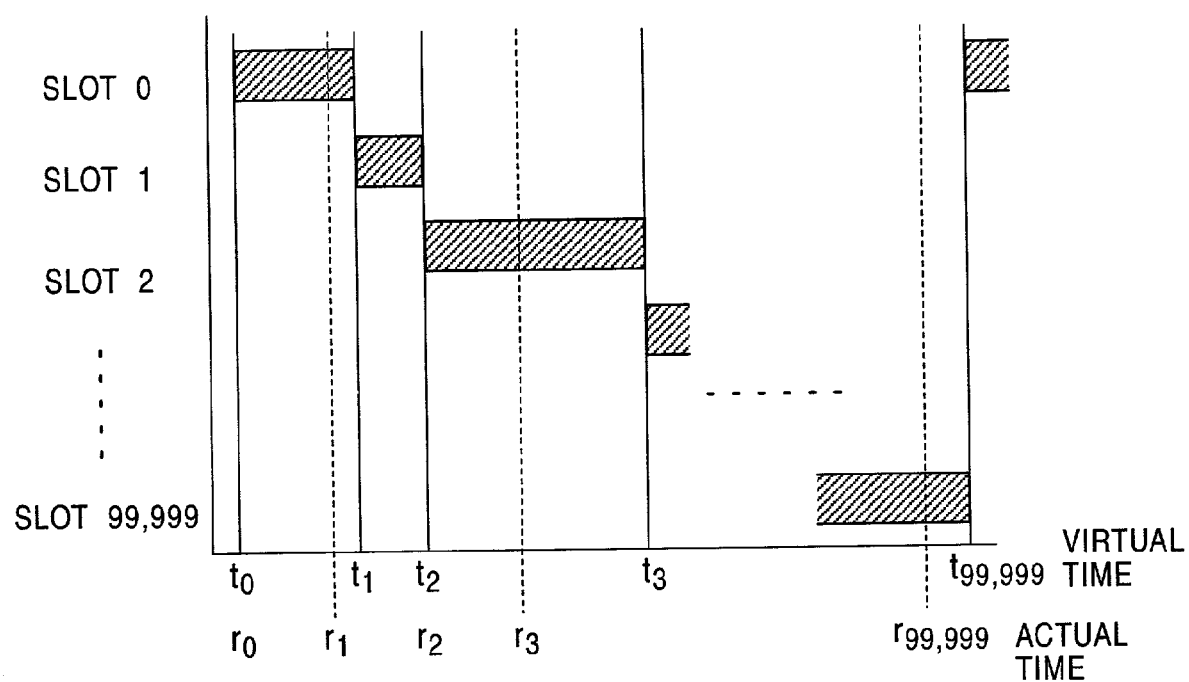
FIG. 7 is a timing chart of transmission processing using virtual time according to the flowchart shown in FIG. 6.

FIG. 7 shows a transmission example of packet data at the slots according to this scheduling processing.

As shown in the figure, with this scheduling processing, multiple slots can be straddled for transfer, according to the size of the packets to be transmitted. Following completion of transmission of each packet data dequeued from one queue, packet data is dequeued from the next queue and transmission is performed.

As shown in the figure, with this scheduling processing, the virtual time $t_0$, $t_1$, and so forth on through $t_{99,999}$, wherein the packet data is transmitted, does not match the real time $r_0$, $r_1$, and so forth on through $r_{99,999}$. However, scheduling processing is performed such that difference between the real time and virtual time in one slot division cycle unit, which is one second in this example, is done away with. Due to this processing, best-effort flow packet data transmission can be realized while guaranteeing the transfer rate of packet data in the bandwidth-guaranteed flow. Also, effects of best-effort flow packet data transmission on bandwidth-guaranteed flow packet data transmission can be minimized.

Next, another processing example of scheduling processing with the network interface according to the present embodiment will be described.

Figure 8:
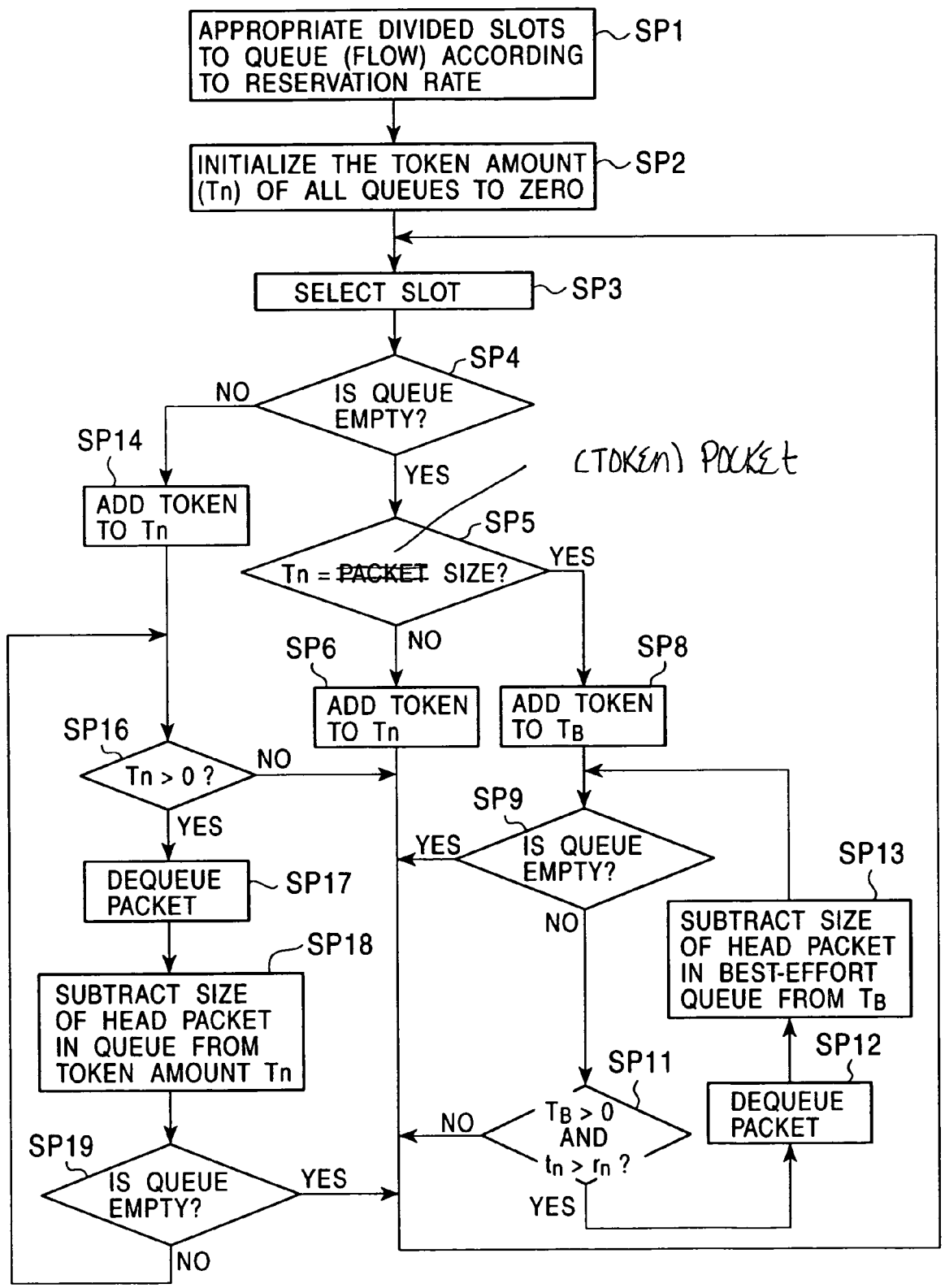
FIG. 8 is a flowchart illustrating another example of packet transmission scheduling processing in a case wherein band reservation flows and best effort flows coexist.
Figures 9, 10:
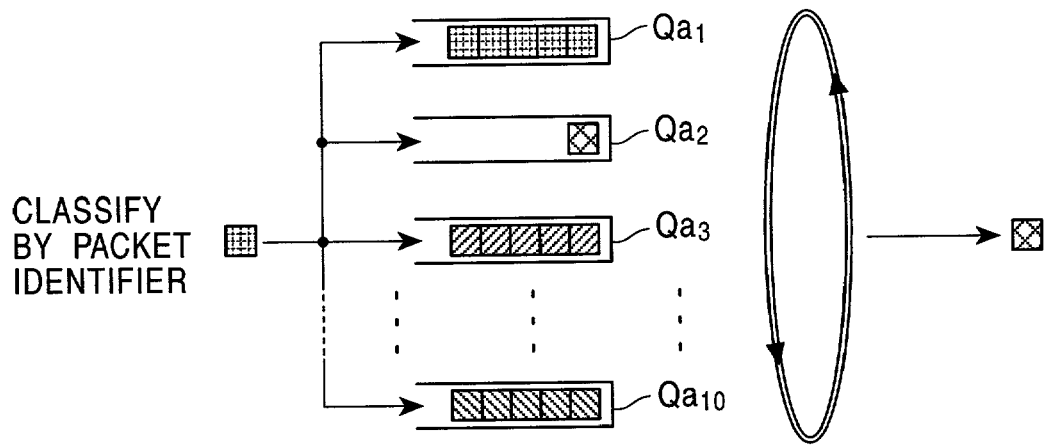
FIG. 9 is a diagram illustrating the concept of conventional packet transmission processing using queues for each flow.
FIG. 10 is a diagram illustrating the configuration of packet headers with the TCP/IP protocol.

FIG. 8 is a flowchart illustrating the scheduling processing. The following is a description of this scheduling operation, with reference to FIG. 8.

First, as shown in the figure, the divided slots are appropriated to the queues (flows) according to the reserved rate (reserved bandwidth) of the flows (step SP1).

Then, the token amount ($T_n$) is initialized to zero for all queues (step SP2).

Next, sequential slot selection is performed (step SP3)

Then, a queue to be transmitted is selected, and decision is made regarding whether the queue is empty or not (step SP4).

In the event that the decision in step SP4 shows that the queue is not empty, the processing in step SP14 is carried out. The processing from SP14 on will be described in detail later.

In the event that the decision in step SP4 shows that the queue is empty, decision is made regarding whether or not the token amount $T_n$ has reached the bucket size or not (Step SP5). In the event that this decision shows that the token amount $T_n$ has not reached the bucket size, a token is added to the token amount $T_n$ (step SP6). Then, the flow returns to the processing in step SP3 wherein the next slot is selected.

In the event that the decision in step SP5 shows that the token amount $T_n$ has reached the bucket size, the token is added to the token amount $T_B$ of the best-effort flow (step SP8). Then, decision is made regarding whether the queue provided for the best-effort flow is empty or not (step SP9).

In the event that the decision shows that the queue is empty, the flow returns to the processing in step SP3 where the next slot is selected.

On the other hand, in the event that the decision shows that the queue is not empty, whether or not the token amount $T_B$ is greater than zero is checked, and comparison between the virtual time $t_n$ and real time $r_n$ is performed as well (step SP11). In the event that the comparison shows that the token amount $T_B$ is greater than zero, and that the virtual time $t_n$ is ahead of the real time $r_n$, the packet data is extracted from the head of the best-effort queue and transmitted to the network (step SP12). The size of the packet transmitted is subtracted from the token amount $T_B$ (step SP13), the processing in step SP9 is performed, and transmission processing for the next packet is performed.

In the event that the comparison in step SP11 shows that the token amount $T_B$ has not yet reached zero, or that the virtual time $t_n$ is behind the real time $r_n$, the flow returns to the processing in step SP3.

In the event that the decision in the processing in step SP4 shows that the queue is not empty, first, a token is added to the token amount $T_n$ (step SP14).

Then, whether or not the token amount $T_n$ is greater than zero is-checked (step SP16).

In the event that the comparison shows that the token amount $T_n$ is zero or smaller, the flow returns to the processing in step SP3.

On the other hand, in the event that the token amount $T_n$ exceeds zero, packets are dequeued from the head of the queue and transmitted (step SP17).

Then, the size of the packet transmitted is subtracted from the token amount $T_n$ (step SP18).

Next, decision is made regarding whether the queue is empty or not (step SP19). In the event that the decision shows that the queue is empty, the processing in step SP3 is carried out.

Conversely, in the event that the queue is not empty, the processing in step SP16 is carried out. That is to say, whether or not to transmit the leading packet of the queue is decided.

With the above-described scheduling processing, in the decision regarding whether or not to transmit best-effort flow packet data, the best-effort flow packet data is transmitted only in the event that the token amount $T_B$ exceeds zero and further in the event that the virtual time $t_n$ is ahead of the real time $r_n$. In all other cases, packet data of flows with bandwidth reservation is transmitted with priority.

Due to such scheduling processing, best-effort flow packet data is transmitted to the network only in the event that sufficient tokens are accumulated for packet output and the virtual time is ahead of the real time, so effects of best-effort flow packet data transmission on bandwidth-guaranteed flow packet data transmission can be minimized.

As described above, with the communication device and communication method according to the present invention, in the event that a single network interface is shared by multiple flows, coexistence of bandwidth-guaranteed flows and best-effort flows can be realized while maintaining the reserved bandwidth for each flow.

Also, according to the present invention, transmission processing is performed with time-division multiplexing for multiple flows so as to avoid simultaneous packet transmission requests from two or more flows from occurring.

Further, bandwidth-guaranteed flow packet data transmission is performed with priority, and best-effort flow packet data transmission is performed only in the event that predetermined conditions are satisfied, thus yielding the advantages in that effects of best-effort flow packet data transmission on bandwidth-guaranteed flow packet data transmission can be minimized.

What is claimed is:

1. A communication apparatus for transmitting multiple flows of packet data including bandwidth-guaranteed flow, said apparatus comprising:
    timing deciding unit for determining transmission timing of packets of said bandwidth-guaranteed flow; and
    packet transmitting unit for transmitting leading packet data in a packet queue according to accumulation capacity of tokens, at a timing set by said timing deciding means,
    wherein
    said packet transmitting unit subtract the size of said transmitted packet from said accumulation capacity of said tokens following transmitting said packet data at the head of said packet queue,
    said multiple flows of packet data include best-effort flow along with bandwidth-guaranteed flow.
    said packet transmitting means transmit said best-effort flow packet data at a timing wherein said bandwidth-guaranteed flow packet data is not being transmitted,
    said packet transmitting means perform transmission of each packet data by time-division multiplex,
    transmission timing appropriated to each of said packet data is real-time, and wherein time at which said packet data is actually transmittable is managed as virtual time, and
    said best-effort flow packet data is transmitted only in the event that said virtual time is ahead of said real-time.

2. A communication apparatus according to claim 1, wherein packet data at the head of said packet queue is transmitted in the event that the accumulation capacity of said tokens exceeds zero.

3. A communication apparatus according to claim 1, wherein said packet transmitting means select said packet queue from a plurality of said bandwidth-guaranteed flow packet queues by procedures established beforehand, and transmit packet data at the head of the packet queue of said selected flow.

4. A communication apparatus according to claim 1, wherein said timing deciding means comprise: a timer for generating timing for managing transmission time; and control means for determining the transmission timing for each flow, based on time information from said timer and information of each flow.

5. A communication apparatus according to claim 1, wherein further comprising packet enqueue means for enqueuing packets to packet queues provided to flows to which said packets belong, according to identifiers of each of said packets.

6. A communication apparatus according to claim 1, wherein the data length of said packet data is fixed.

7. A communication apparatus according to claim 1, wherein the data length of said packet data is variable.

8. A communication method for transmitting multiple flows of packet data including bandwidth-guaranteed flow, said method comprising: a timing deciding step for determining transmission timing of packets of said bandwidth-guaranteed flow by time-division multiplexing; and a packet transmitting step for transmitting leading packet data in a packet queue according to accumulation capacity of tokens, at said timing decided upon,
wherein,
the size of said transmitted packet is subtracted from said accumulation capacity of said tokens following transmitting said packet data at the head of said packet queue,
said multiple flows of packet data include best-effort flow along with bandwidth-guaranteed flow,
said best-effort flow packet data is transmitted in said packet transmitting step at a timing wherein said bandwidth-guaranteed flow packet data is not being transmitted,
transmission timing appropriated to each of said packet data is real-time, and wherein time at which said packet data is actually transmittable is managed as virtual time, and
said best-effort flow packet data is transmitted only in the event that said virtual time is ahead of said real-time.

9. A communication method according to claim 8, wherein packet data at the head of said packet queue is transmitted in the event that the accumulation capacity of said tokens exceeds zero.

10. A communication method according to claim 8, wherein said packet queue is selected from a plurality of said bandwidth-guaranteed flow packet queues by procedures established beforehand, and packet data at the head of the packet queue of said selected flow is transmitted.

11. A communication method according to claim 8, wherein input packets are input to packet queues provided to flows to which said packets belong, according to identifiers of each of said packets.

* * * * *